April 19, 1927.
O. C. STUMP ET AL
1,625,505
COLLISION SIGNAL SWITCH
Filed Feb. 21, 1925
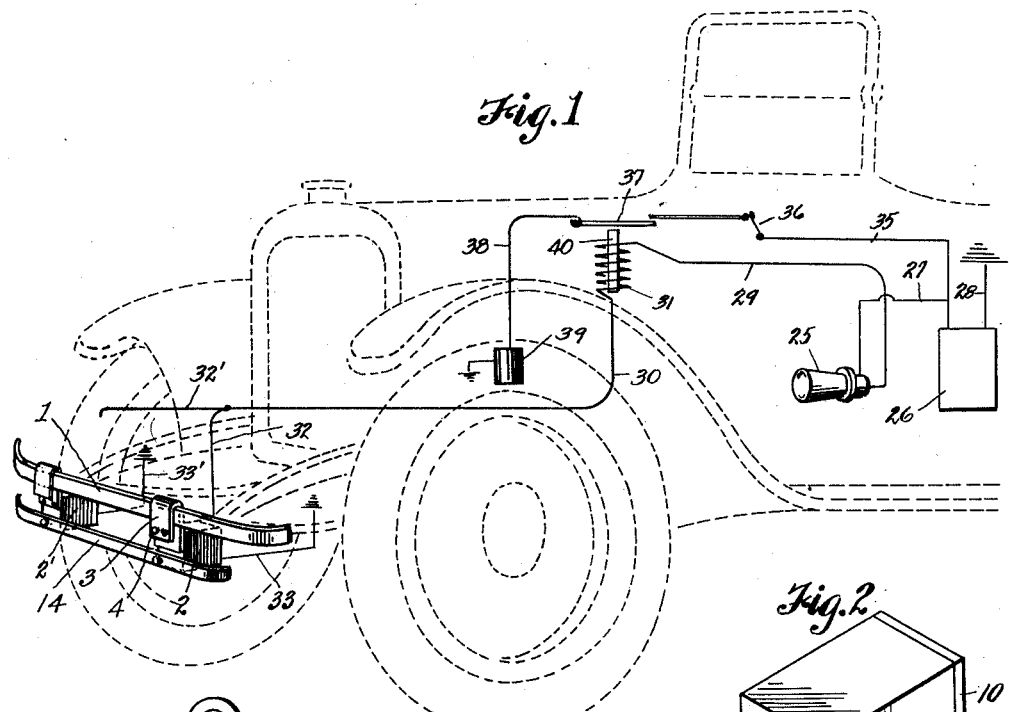
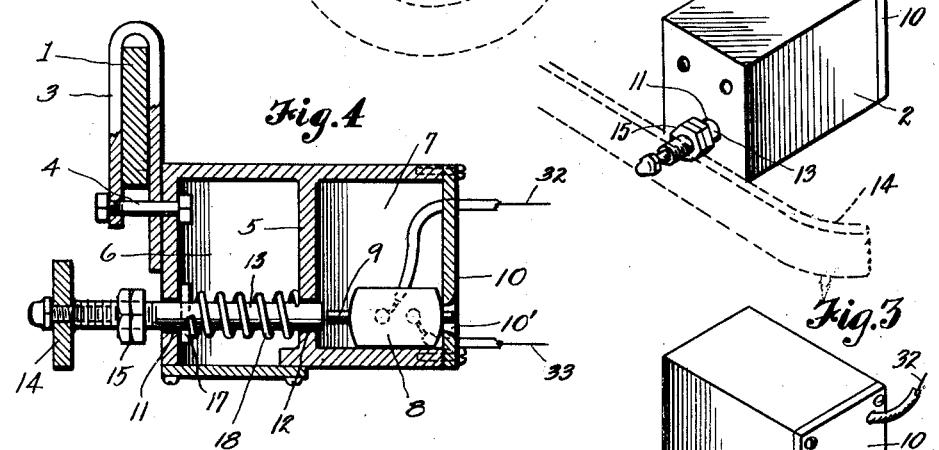
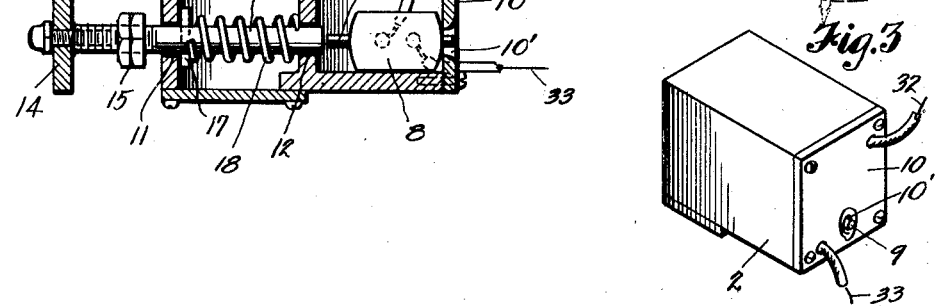
OSCAR C. STUMP
EARL R. STUMP
INVENTORS
BY Richard J. Cook
ATTORNEY Patented Apr. 19, 1927.

1,625,505

UNITED STATES PATENT OFFICE.

OSCAR C. STUMP AND EARL R. STUMP, OF SEATTLE, WASHINGTON.

COLLISION-SIGNAL SWITCH.

Application filed February 21, 1925. Serial No. 10,748.

This invention relates to improvements in collision signals for automobiles and more particularly to electrically operated signals adapted to be carried by the bumper bars and which are operable upon impact with another object.

It is the principal object of the invention to provide an audible signaling means which will operate to warn the driver should he strike an object and which will serve also to warn others should the driver unlawfully attempt to escape after striking a pedestrian or another vehicle.

More specifically stated, the object of the invention resides in the provision of a device of the above character which supports an auxiliary bumper bar slightly in advance of the main or fixed bumper and which is operable upon depression, such as would be caused by collision with an object to close a circuit through a signaling device to sound an audible warning.

It is also an object to provide a switch in the signal circuit which is closed by the depression of the auxiliary bumper and which is so located that the driver must stop the vehicle and dismount in order to reach it to disconnect the signal.

A still further object is to include means whereby operation of the signal opens the ignition circuit of the motor to stop the latter.

Other objects reside in the various details of construction and combination of parts as hereinafter described.

In accomplishing these and other objects of the invention, we have provided the improved details of construction, the preferred forms of which are illustrated in the accompanying drawings, wherein—

Figure 1 is a diagrammatic illustration of a vehicle equipped with a collision signal embodied by the present invention showing the circuit connections with the signaling device, battery, vibrator and control switch.

Figure 2 is a perspective view of one of the switch housings and circuit closing devices, taken from a point forwardly of and at one side of the device.

Figure 3 is a similar view showing the rear end of the housing.

Figure 4 is a sectional view of the housing showing the manner of mounting it on the bumper bar, the location of the switch, and the switch actuating push rod.

Referring more in detail to the several views of the drawings—

1 designates a bumper bar that may be fixedly mounted transversely across the front of a vehicle, as designated in dotted lines in Figure 1. The particular style of the bumper and its manner of mounting from the vehicle frame is immaterial except that it provides a means of support for the present device.

Supported from the bar 1, near its opposite ends, are switch housings 2—2', each of which is of box-like form and is supported rigidly by means of a plate 3 that is looped over the bar 1 and is secured by bolts 4 to the forward end wall of the housing, as shown best in Figure 4.

The switch housings are divided by partition walls 5 forming forward and rearward compartments 6 and 7 and in the latter are switches 8 operable between "on" and "off" position by the shifting of switch pins 9; the rearward ends of which are accessible through openings 10' in the rear walls 10 of the housings.

Mounted slidably in the housings in openings 11 and 12 in the front and partition walls are push rods 13 which at their forward ends support an auxiliary bumper bar 14 slightly in advance of bar 1. The rearward ends of push rods 13 are disposed in alinement with switch pins 9 in such manner that inward depression of the rods incidental to impact of bar 14 with an object will close the switch. Movement of the push rods inwardly is limited, so as not to cause injury to the switches, by means of nuts 15 threaded onto their outer ends to engage with the forward end walls of the housings. Outward movement is limited by pins 17 through the rods adapted to seat against the inner faces of the forward walls. Normally the push rods are yieldably held at their outer limits of travel by coiled springs 18 wound about the rods within the housings and bearing against the partition walls and the pins 17.

Referring more to Figure 1, 25 designates an electrically operated horn or other signaling device and 26 a battery or other source of electrical energy having one pole connected by a wire 27 with one terminal of the horn and its other pole grounded by wire 28. The other terminal of the horn is connected by circuit wires 29 and 30 through a solenoid coil 31 with wires 32—32' which join with terminals of the two switches 8; the other terminals of the switches being grounded by wires 33—33'.

With the above connection, the switches are normally open but should the bar 14 be depressed at either or at both ends, one or both of said switches will be closed by inward movement of push bars and thus the circuit through the horn will be closed and the warning sounded until the circuit is broken by adjustment of switch pin 9 made possible by exposing the end thereof within the opening 10 of the housing.

Also connected with the battery is a wire 35 which leads through a switch 36 and armature 37 to a wire 38 that connects with one side of a generator coil 39; the other side of the coil being grounded. So long as the horn circuit is open, the armature remains in circuit closing contact with wires 35 and 38 but upon energization of the coil, the armature will be drawn against the core bar 40 of the solenoid and the circuit will be broken and in this way coil 39 is de-energized and no circuit produced for the sparking means in the cylinders of the vehicle engine.

Having thus described our invention, what we claim as new therein and desire to secure by Letters Patent, is:

1. In a motor vehicle, in combination, a fixed bumper bar, a housing fixed to the said bumper bar, an electric switch mechanism contained in said housing and comprising a switching member that is movable between "off" and "on" positions, a push rod slidably mounted in said housing with its inner end disposed in position to engage with the said switching member to move it from "off" to "on" position, and having its outer end extended from the housing forwardly of the fixed bumper, yieldable means for resisting inward movement of the push rod and a bumper supported by the outer end of said push rod.

2. In a motor vehicle, in combination, a fixed bumper bar, a housing fixed to the said bumper comprising a forward wall and a partition wall, said walls being provided with alined openings, an electric switch contained within said housing having a switching element adapted to be actuated between "off" and "on" position, a push rod slidably mounted in said alined openings of said housing, having its forward end extending forwardly of the fixed bumper and its rearward end disposed in position to be engaged with the said switching element to move it from "off" to "on" position when said push rod is actuated inwardly, a bumper bar mounted at the forward end of the push rod, means on the push rod engageable with a wall of the housing for limiting its forward movement, means adjustable on the push rod for limiting its inward movement, and yieldable means for normally urging the push rod to its forward limit.

Signed at Seattle, King County, Washington, this 21st day of January, 1925.

EARL R. STUMP.
OSCAR C. STUMP.